Figure 1:
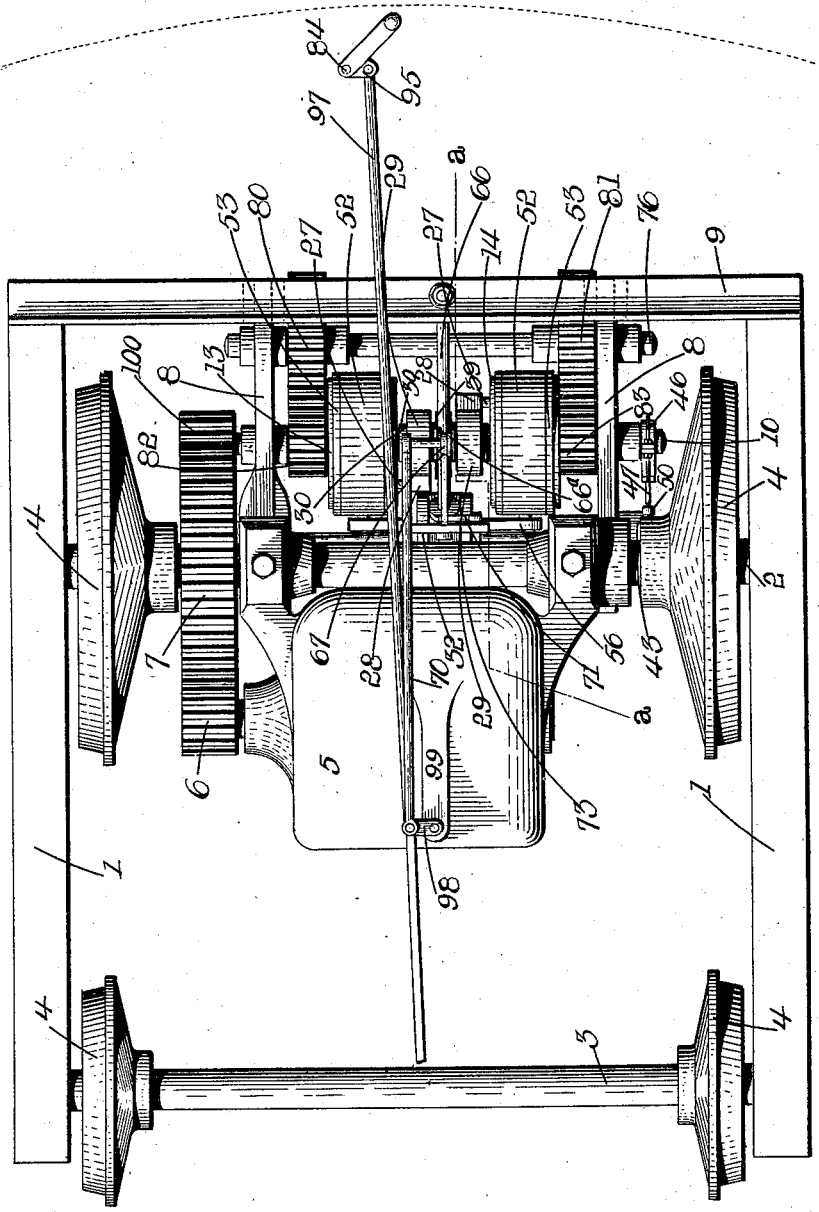

No. 723,852. PATENTED MAR. 31, 1903.
J. A. FIELD.
SPRING BRAKE.
APPLICATION FILED JULY 5, 1902.
NO MODEL. 8 SHEETS—SHEET 2.

Witnesses. Inventor.
L. M. Bangster. Jesse A. Field.
Geo. A. Neubauer. By C. J. Langster
Attorney.

THE NORRIS PETERS CO., PHOTO-LITHO., WASHINGTON, D. C.

No. 723,852. PATENTED MAR. 31, 1903.
J. A. FIELD.
SPRING BRAKE.
APPLICATION FILED JULY 5, 1902.
NO MODEL. 8 SHEETS—SHEET 3.

Witnesses. Inventor.
L. M. Sangster. Jesse A. Field.
Geo. A. Neubauer. By A. J. Sangster.
Attorney.

No. 723,852. PATENTED MAR. 31, 1903.
J. A. FIELD.
SPRING BRAKE.
APPLICATION FILED JULY 5, 1902.
NO MODEL. 8 SHEETS—SHEET 4.
Fig. 7.
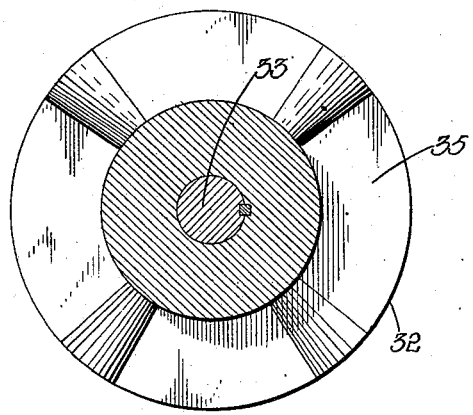
Fig. 8.
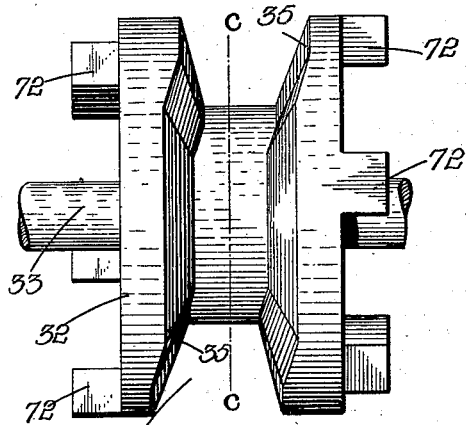
Fig. 9.
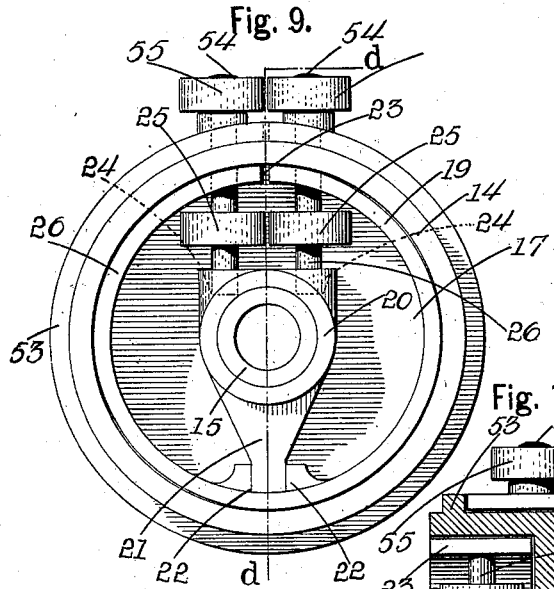
Fig. 10.
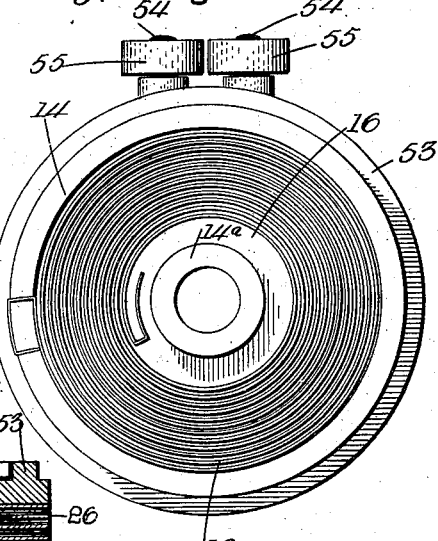
Fig. 11.
Fig. 12.
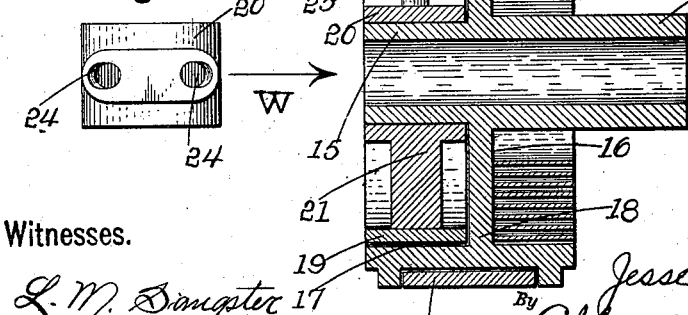
Fig. 13.
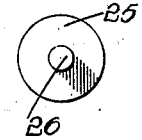
Witnesses. Inventor.
L. M. Sangster Jesse A. Field.
Geo. A. Neubauer. By A. J. Sangster,
Attorney.

No. 723,852. PATENTED MAR. 31, 1903.
J. A. FIELD.
SPRING BRAKE.
APPLICATION FILED JULY 5, 1902.
NO MODEL. 8 SHEETS—SHEET 5.
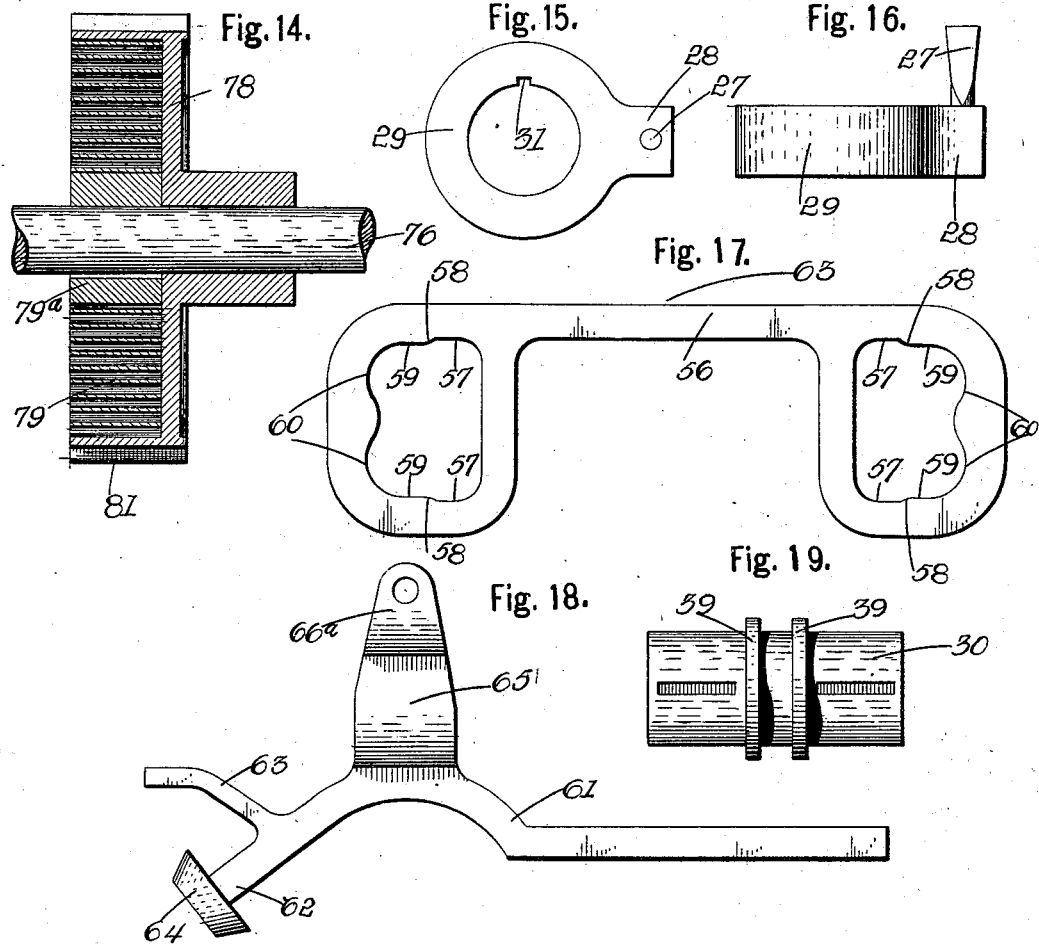
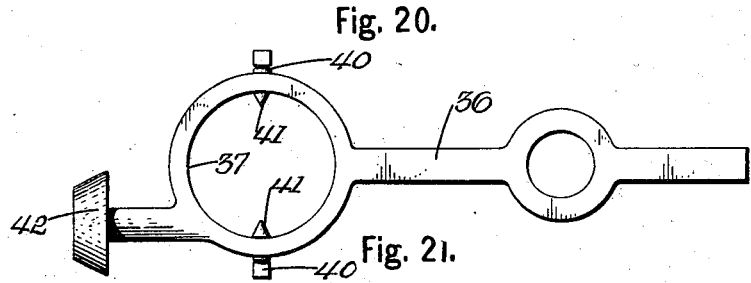
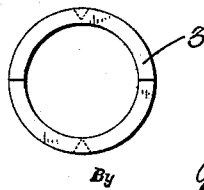
Witnesses.
L. M. Sangster.
Geo. A. Neubauer.
Inventor.
Jesse A. Field.
By A. J. Sangster
Attorney.

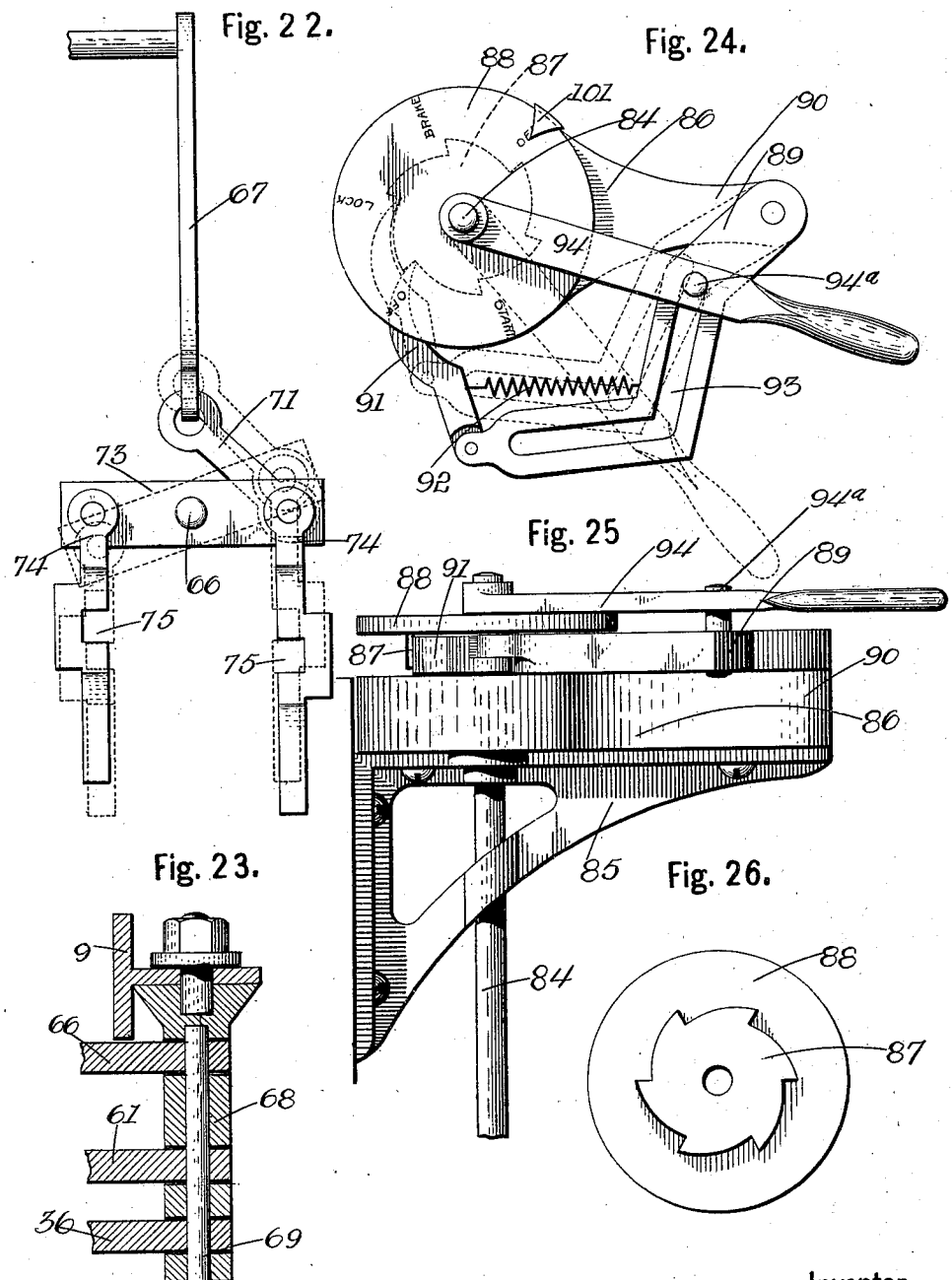

No. 723,852. PATENTED MAR. 31, 1903.
J. A. FIELD.
SPRING BRAKE.
APPLICATION FILED JULY 5, 1902.
NO MODEL. 8 SHEETS—SHEET 8.

Witnesses.
L. M. Sangster
Geo. A. Neubauer.

Inventor.
Jesse A. Field.
By A. J. Sangster, Attorney.

UNITED STATES PATENT OFFICE.

JESSE A. FIELD, OF DUNKIRK, NEW YORK.

SPRING-BRAKE.

SPECIFICATION forming part of Letters Patent No. 723,852, dated March 31, 1903.

Application filed July 5, 1902. Serial No. 114,396. (No model.)

*To all whom it may concern:*

Be it known that I, JESSE A. FIELD, a citizen of the United States, residing at Dunkirk, in the county of Chautauqua and State of New York, have invented certain new and useful Improvements in Spring-Brakes, of which the following is a specification.

This invention relates to a spring-brake construction which is adapted to be thrown into operative connection with a rotating element, such as a shaft or axle, to gradually stop the rotation thereof, the spring being wound after operative connection with the rotating element by the remaining revolutions of said element, and thus acting with increasing tension to stop the same. The wound spring also serves as a starting device for the rotating element, the tendency of the spring to unwind automatically starting the revolution of the rotating element.

In the adaptation of the invention shown a spring mechanism is attached to the bottom of a street-car, being arranged so that when operatively connected with the axle of the car the spring will be wound and will gradually stop the rotation of the axle, and thus bring the car to a standstill. When it is desired to again start the car, the spring is released and in unwinding automatically imparts rotation to the car-axle.

The object of the invention is to gradually stop the rotating element by a brake having increasing strength, and thus avoid a quick or harsh acting brake, also to utilize the power stored up by the application of the brake to again start the rotating element when desired.

The invention also relates to certain details of construction, all of which will be fully and clearly hereinafter described and claimed, reference being had to the accompanying drawings, in which an adaptation of the invention attached to a street-car is shown.

Figure 2:
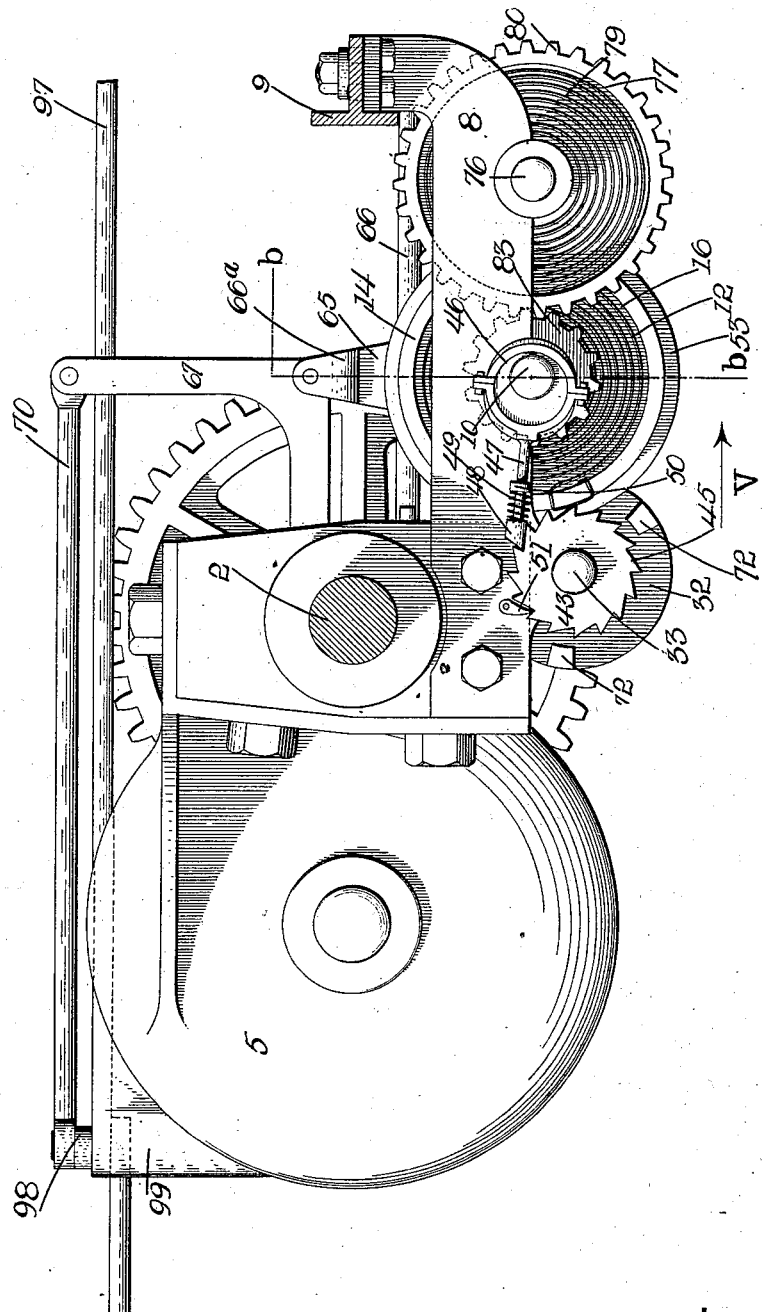
Figures 3, 4, 5, 6:
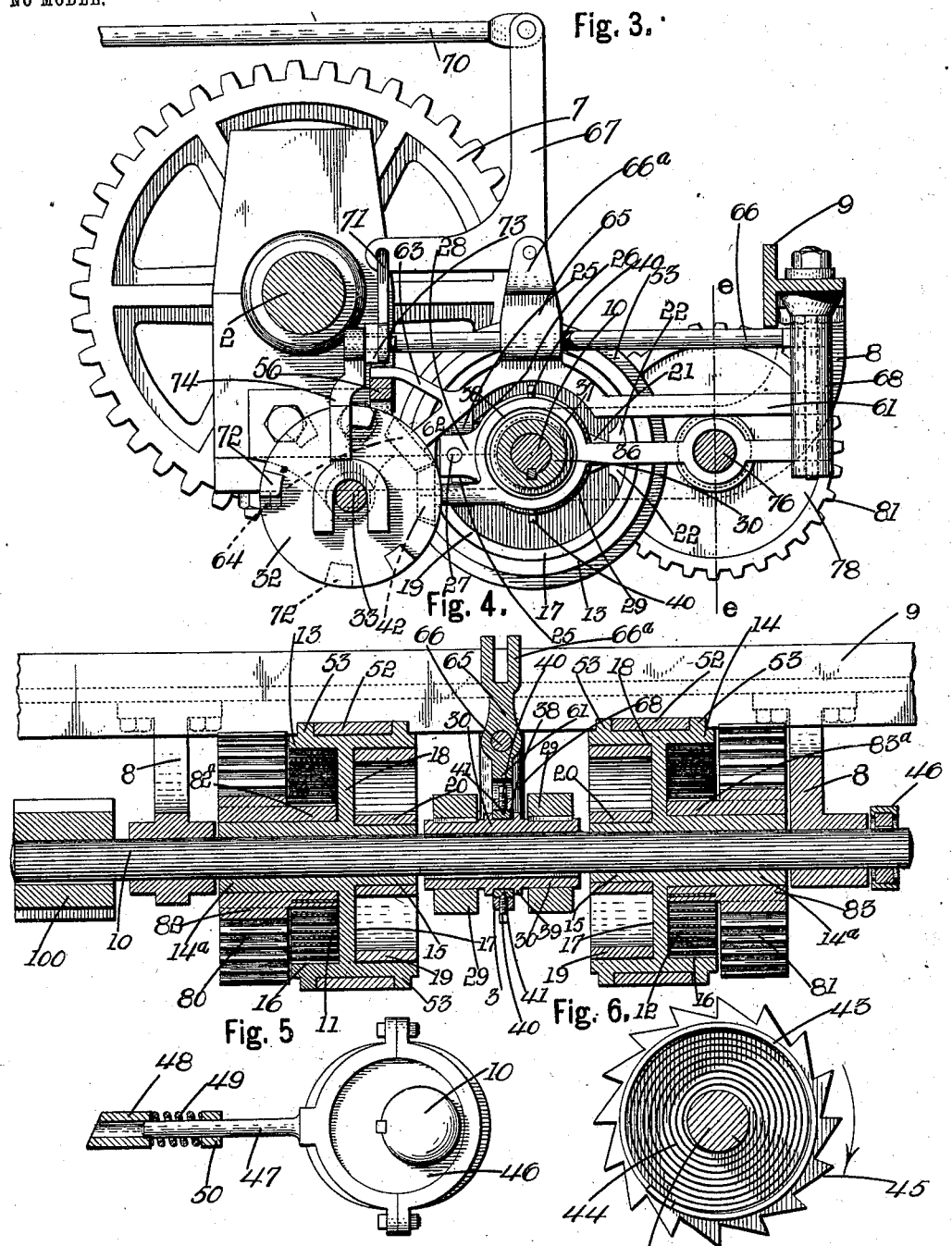
Figure 27:
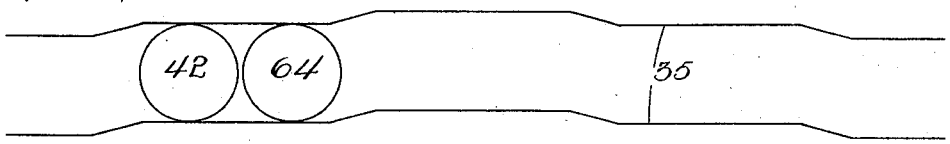
Figure 28:
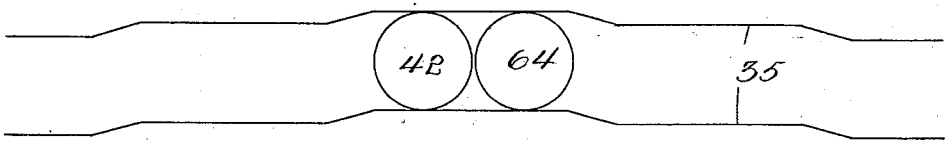
Figure 29:
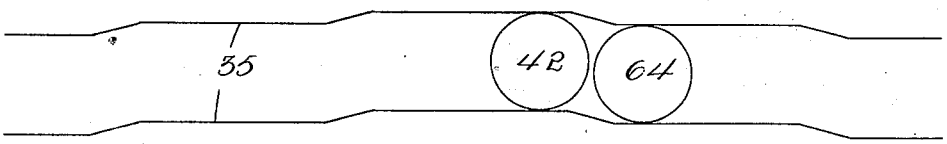
Figure 30:
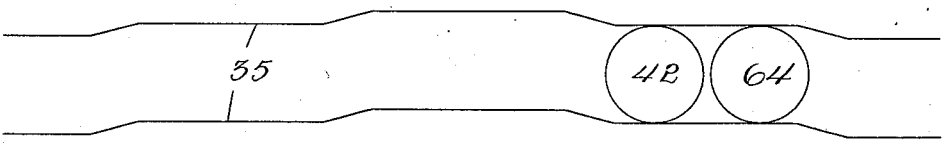
Figure 31:
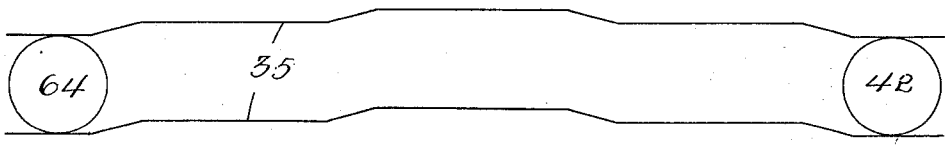
Figure 32:
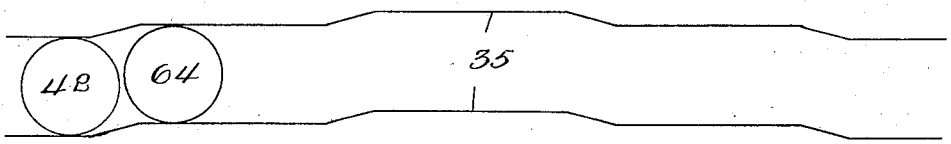
Figure 33:
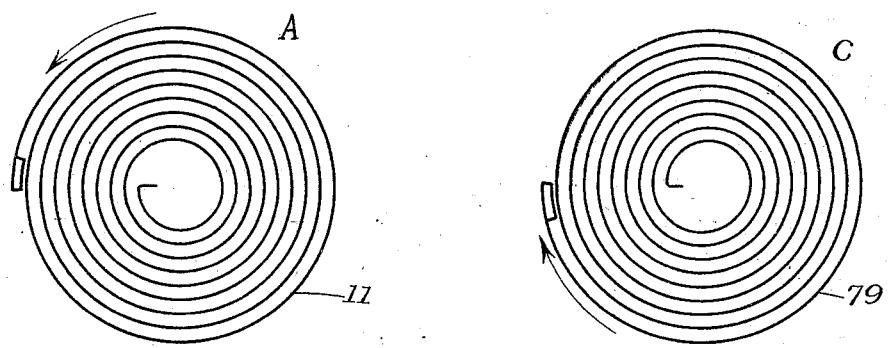
Figure 34:
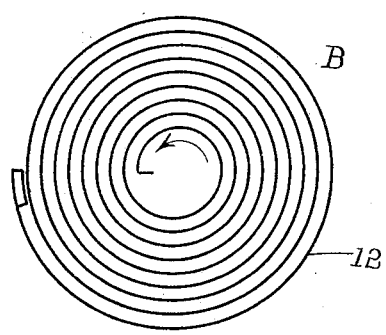
Figure 35:
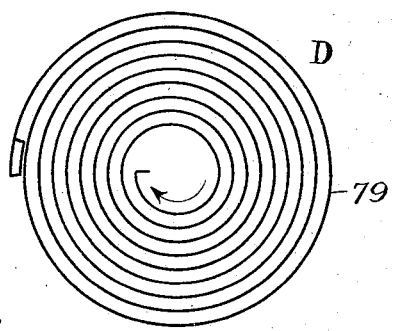

Figure 1 is a top plan view of the spring-brake mechanism, showing the outline of the car-floor in dotted lines. Fig. 2 is an enlarged side elevation of the brake mechanism, a section being taken through the main axle and the wheels being removed. Fig. 3 is an enlarged vertical section on or about line $a\,a$, Fig. 1. Fig. 4 is a section on or about line $b\,b$, Fig. 2, looking in the direction of the arrow V. Fig. 5 is an enlarged side view of the eccentric and its shaft, a section being taken through the ratchet-operating collar and spring. Fig. 6 is an enlarged side view of the ratchet, spring, and inclosing case for operating the cam, also showing a section through its shaft. Fig. 7 is a section through the operating-cam on line $c\,c$, Fig. 8. Fig. 8 is an enlarged end view of the operating-cam. Fig. 9 is an enlarged side view of one of the clutch devices and spring-inclosing cases looking in the direction of the arrow W, Fig. 11. Fig. 10 is an enlarged elevation of one of the clutch devices and spring-inclosing cases looking in the direction opposite to the arrow W, Fig. 11. Fig. 11 is a central section through the clutch device and case on line $d\,d$, Fig. 9. Fig. 12 is a detached top plan view of the block for supporting the rollers and shafts of the inner clutch. Fig. 13 is a detached plan view of one of the rollers and its shaft. Fig. 14 is an enlarged detached section through one of the springs and its inclosing case on line $e\,e$, Fig. 3, also showing a fragment of its shaft. Fig. 15 is an enlarged side view of one of the collars carrying the inner clutch-operating wedge. Fig. 16 is a plan view of the collar shown in Fig. 15. Fig. 17 is an enlarged detached side view of the link. Fig. 18 is an enlarged detached side elevation of the device for operating the link. Fig. 19 is an enlarged plan view of the shifting sleeve. Fig. 20 is an enlarged detached side view of the device for operating the shifting sleeve. Fig. 21 is a detached side view of the split collar. Fig. 22 is an enlarged detached front elevation of the stop device and the bell-crank, showing the stop device in one position in full lines and in another position in dotted lines. Fig. 23 is a central vertical section through a fragment of the mechanism, showing the manner of supporting the ends of the levers. Fig. 24 is a detached plan view of an indicating device for operating the brake. Fig. 25 is a side elevation of the indicating device, showing its attachment to a fragment of the controller-box of a car. Fig. 26 is a bottom plan view of the rotating indicating-disk to illustrate the disk ratchet-wheel. Figs. 27 to 32 are diagrammatic views of the cam, showing the different positions of the rollers for operating the link and shifting sleeve. Fig. 33 is a diagrammatic view of the springs. Fig. 34 is a detached face view of one side of the cam-disk. Fig. 35 is a detached face view of the opposite side of the cam-disk.

In referring to the drawings in detail like characters designate like parts.

In the adaptation of the invention to street or similar cars, as shown, 1 represents the frame of one of the trucks; 2 and 3, the axles journaled in the frame; 4, the wheels, and 5 the motor. The motor-box is mounted on the truck and one of the axles and is geared to said axle by meshing gear-wheels 6 and 7 in the usual manner. Two longitudinally-extending frame-bars 8 extend between the forward bar 9 of the frame and the axle 2, connected to the motor, (see Fig. 1,) and one or more transverse shafts are journaled in said bar. I have shown two shafts in the drawings; but more or less may be employed, if desired.

The shaft 10, which I preferably term the "main-spring-supporting shaft," has a plurality of springs mounted thereon and inclosed within cases.

Two springs 11 and 12 are preferably employed, which are coiled in opposite directions and are connected at their inner ends to gear-wheels loosely mounted on the shaft and will be more fully hereinafter explained, and the cases (indicated as a whole by 13 and 14 in Fig. 1) inclosing these springs are loose on the shaft and are connected to the outer end of the springs.

The construction of the inclosing case is shown in Figs. 9, 10, and 11 and has a hub 15, through which the shaft 10 loosely passes, an inclosing compartment 16 for the spring, and an inclosing compartment 17 for a clutch mechanism, said compartments being separated by a wall 18.

The clutch mechanism is preferably as follows, referring to Figs. 9, 10, 11, and 12: A split ring 19 is mounted in the compartment 17, and a collar 20, which is fitted loosely around the hub 15, has a lateral extension 21, secured between two ears or lugs 22, projecting inwardly from the side opposite the split 23 in the ring. Two depressions or recesses 24 are formed in the top surface of the collar, which is preferably horizontal, and the outer wall portions of these recesses taper or incline to enlarge the depressions as they near the top, substantially as shown in Fig. 12 and in dotted lines in Fig. 9. The split collar is spread against the interior of the compartment 17 by rollers 25, which are mounted on shafts 26. The lower ends of the shafts are seated in the depressions 24, which are tapered on one side, as before described, to permit lateral movement of the upper ends of the shafts. The rollers are separated from each other and forced against the collar to spread the same and cause it to frictionally engage the interior of the compartment 17 by a tapered wedge 27, which projects laterally from an extension 28 of a ring 29. (See Figs. 15 and 16.) Two sets of these clutch mechanisms are employed, one for each inclosing case, and each set is thrown into clutching position by a separate wedge. To distinguish these clutch mechanisms from another clutch mechanism to be hereinafter described, I will term them the "inner" clutch mechanisms. Two rings 29 are used, one being mounted near each end of a sleeve 30, which is shiftably arranged on the shaft 10 between the two springs. The rings 29 are keyed to the sleeve by a key which passes through the keyway 31 (shown in Fig. 15) to prevent independent rotation of the rings, and the sleeve is adapted to be shifted on the shaft to move either one of the wedges into separating position between a set of rollers. The sleeve 30, which I will hereinafter designate as the "shifter," can be moved into central position midway between the springs, in which position neither of the wedges is in operating position, or in either direction to move one of the wedges into separate position and throw either of the clutch mechanisms into clutching position. The shifter rotates in unison with the shaft 10, as it is keyed to it. The inner clutch mechanism when in clutching position serves to rotate the inclosing cases and wind up the springs. The shifter is moved by cam mechanism controlled by a handle within convenient reach of the operator or motorman. The preferable form of this cam is shown in Figs. 7 and 8.

A circular disk 32 is mounted on a shaft 33, mounted in bearings beneath the car-frame, and is provided with a peripheral recess or depression 34, the opposed walls of which are beveled or inclined in parts to form cam-surfaces 35, substantially as shown in Fig. 8. These opposed walls 35 extend substantially in parallism, as shown in the diagrammatic views in Figs. 27 to 32, inclusive. A shifting arm 36 has a substantially circular opening 37, (see Fig. 20,) which encircles a split collar 38, mounted on the shifter 30 between the peripheral flanges 39 of said shifter. The arm is secured to the collar by the opposed screw-bolts 40, the cone-points 41 of which seat in the depressions shown in dotted lines in Fig. 21. The shifting arm 36 is angular in form, and a roller 42 is rotatably mounted at one end, which travels between the opposed cam-walls 35, and thereby moves the shifter. The shaft 33 has an inclosing case 43 loosely mounted thereon, and a spring 44 is arranged within the inclosing case, being connected at its respective ends to the shaft 33 and the case 43. (See Fig. 6.) The periphery of the inclosing case is provided with a series of ratchet-teeth 45, and an eccentric 46, mounted on the shaft 10, has a pawl which engages the ratchet-teeth, and thus gradually winds up the spring. The pawl is extensible and preferably in two parts. In the construction shown in Fig. 5 a rod 47 extends from the eccentric and telescopes or slides in a tubular part 48, which operates against the ratchet-teeth. A spring 49 is mounted on the rod between a collar 50 on the rod and the inner end of the tube and presses the end of the tube outwardly against the ratchet-teeth. The function of the spring 49 is to yieldingly tension the tube against the ratchet-teeth. The inclosing case is rotated by the thrust of the pawl against the ratchet-teeth until the spiral spring 44 within the case is wound sufficiently tight to force the tube back against the spring 49, and thus prevent the pawl turning the inclosing case. The spring 44 can only be wound to a certain tension, owing to the yielding of the tube, and will be automatically rewound to that tension by the operation of the pawl after unwinding. A second or locking pawl 51 is pivoted to the frame and engages with the ratchet-teeth to prevent the case unwinding when the operating-pawl is moving out of engagement with one of the ratchet-teeth and entering into engagement with another.

An outer clutch mechanism is provided for locking the inclosing cases 13 and 14 against rotation in either direction, and thus preventing the unwinding of the springs. This outer clutch mechanism preferably consists of a split band 52, which encircles the inclosing case, being retained in place between the peripheral shoulders 53, (see Fig. 11,) a rod 54, projecting outward from near each end of the band 52, and a roller 55, mounted on each rod. The rollers of both bands are connected by a link 56, formed substantially as shown in Fig. 17, each end of the link being of a loop shape, in which the rollers of one of the bands loosely fit. The inner surface of the loop is such that both of the bands may be held tight around the cases or one may be tight and the other loose. The inner surfaces of the opposite longitudinal walls of each loop extend substantially parallel for a short distance, as shown at 57 in Fig. 17, and then curve inwardly toward each other at 58, again extend parallel to each other at 59, and finally curl toward each other to substantially the curved form of the rollers to form a curved seat 60 for the rollers when in locked position. The converging portions 58 are approximately midway between the transverse walls of the loop, and the middle of all of the rollers is slightly past these portions 58, between the portions 59, when the link is in central position, so that both the bands are in locking position when the link is in a central position. The movement of the link in either direction will cause the rollers on one side to roll between the portions 57, and thus loosen the band to which those rollers are connected, and the rollers on the opposite side to roll more firmly into their seat 60. The link is moved by an angular lever 61, preferably formed substantially as shown in Fig. 18. This lever has two diverging branches 62 and 63 at one end, the lower branch of which carries a roller 64, which operates between the cam-surfaces 35. The upper branch 63 is fastened at its end to approximately the center of the link 56 and serves to move the link to operate the outer clutches. The lever has a vertical part 65, extending up from about its middle, which is provided with a horizontal opening, through which a rod 66 passes. The upper extreme 66ª of the part 65 is forked, as shown in Fig. 4, and a bell-crank 67 is pivoted between the forks. The inner extreme of the shifting arm 36, the lever 61, and the rod 66 are supported in openings in a vertical standard 68, forming a part of the frame, and are secured therein by a pin 69, substantially as shown in Fig. 23. The upper end of the bell-crank is pivoted to a connecting-rod 70 and the lower end to a link 71. The cam-disk 32 is provided with a series of lateral enlargements or stops 72, which project from each side thereof, and the lower end of the link is connected to one end of a bar 73, which is mounted transversely on the rod 66. Two vertical bars 74 depend from the bar 73, one from each end thereof, and are adapted to extend close to the opposite sides of the cam-disk 32, against which the stops 72 strike to prevent rotation of the cam-disk. The bars 74 are each provided with a recess or depression 75 on its inner surface, substantially as shown in Fig. 22, and are adapted to be raised or lowered by rocking the bar 73, substantially as shown in dotted and full lines in Fig. 22, to bring the recess horizontal with an adjacent stop 72, and thus permit the cam-disk to move one step, the bar 74 on the opposite side striking a lug on the opposite side of the cam-disk and preventing the cam-disk from moving more than one step.

The springs arranged on the main shaft 10 are operatively connected through a supplementary system of springs and gear-wheels mounted on a supplementary shaft 76, journaled in the frame in front of the shaft 10. (See Fig. 1.) Two inclosing cases, which I will indicate by the numerals 77 and 78 in Fig. 1 to show their position, are mounted on the shaft 76 and inclose spiral springs 79. The periphery of these cases is toothed to constitute gears 80 and 81, which mesh with gear-wheels 82 and 83. The inclosing cases 13 and 14 are provided with hubs 14ª, upon which the gear-wheels 82 and 83 are loosely mounted. (See Fig. 4.) The gear-wheels 82 and 83 have lateral extensions 82ª and 83ª, which project within the inclosing cases and to which the inner ends of the springs 11 and 12 are fastened. The spiral springs 79 (shown in Fig. 14) are attached at their inner extremes to hubs 79ª, mounted on the shaft 76, and at their outer extremes to the inclosing cases.

One form of operating mechanism for throwing the brake into and out of action is illustrated in Figs. 24, 25, and 26. A vertical shaft 84 is journaled in a bracket 85, mounted on the car within convenient reach of the operator. A horizontal block 86 is mounted on the bracket, and a ratchet-wheel 87 is rotatably mounted on the shaft 84 near the upper end of said shaft and above the block, and a position-indicating disk 88 is attached to the upper surface of the ratchet-wheel. An angular arm 89 is pivoted at one end to an extension 90 of the block, and a pawl 91 is pivoted to the opposite end of the arm. The pawl 91 is held in engagement with the ratchet-teeth by a spring 92. The angular arm 89 is provided with an angular slot 93, which is of a wide-V form, (see Fig. 24,) and a brake-handle 94, pivoted at its inner end to the upper end of the shaft 84 above the disk 88, has a pin 94$^a$, which slides in the slot 93. A movement of the brake-handle sufficient to slide the pin in the slot from one end of said slot to the other imparts a partial rotation to the ratchet-wheel, which turns the indicating-disk to show the position of the brake mechanism. The vertical shaft 84 extends downward and has a crank 95 at its lower end, which is connected at its outer end to a long connecting-rod 97. The rear end of the connecting-rod 97 is pivoted to one end of a crank 98, which has its opposite extremity pivoted to a longitudinal enlargement 99 of the motor 5. (See Fig. 1.) The pivoting-point of the connecting-rod 97 and crank 98 is exactly in the center of the car-truck, so that the movement of the truck rounding curves will not affect the operation of the brake mechanism. The rear end of the connecting-rod 70 is pivoted to the crank 98 vertically above the pivoting-point of the rod 97.

The ratchet-wheel, operating-pawl, indicating-disk, and angular arm of the position-indicating mechanism are left off of Fig. 1 in order to more clearly show the position of the various connecting-rods, links, &c.

The operation of the spring-brake mechanism as shown in the present adaptation applied to a street-car is as follows: The movement of the brake-handle 94 from one position to another moves the angular arm 89, which in turn moves the pawl 91 forward to impart a partial rotation to the ratchet-wheel 87, and then retracts the pawl to its initial position. The motion is transmitted from the shaft 84 through the cranks 95 and 98, link 96, and the connecting-rods 70 and 97 to the bell-crank 67, which rocks the bar 73, through the link 71, and thereby raises one of the bars 74, bringing the depression 75 in one bar horizontal with one of the enlargements 72 on the cam-disk 32 and permitting said enlargement to pass through said depression. The rocking of the bar 73 also lowers the opposite bar 74 and brings it into position to catch the enlargement 78 on the opposite side of the cam-disk, and thereby stop the rotation of the disk. The cam-disk is moved or turned by tension of the spring 44, as before described. When the car is in motion, the rotation of the axle is imparted to the main shaft 10 by the gear-wheel 100, which meshes with the gear-wheel 7 on the axle, as shown in Fig. 1. The shifter will be in central position, and both of the inner clutch mechanisms will be free. The loop-link 56 will also be in central position, and both of the outer clutch mechanisms will be tight. The position-indicating disk 88 is provided with indicating-words on its top surface—such as "Start," "Off," "Lock," "Brake"—which serve to indicate the position of the brake mechanism to the operator—such as a motorman, for instance. In Fig. 24 the word "Off" is beneath the indicating-hand 101, which indicates that the brake is off, so that the car can be in motion.

The word "Brake" when arranged beneath the hand 101 indicates that the brake is set, the word "Lock" that the springs are locked in their wound-up condition, and the word "Start" that they are released to start the car.

To slacken the speed gradually without coming to a dead stop, the power is shut off and the brake-handle moved from one position to another—that is, the length of the slot 93. This brings the word "Brake" on the indicating-disk under the indicating-hand 101 and permits the cam-disk to partially rotate or move one step and brings the rollers 42 and 64 from the position shown in Fig. 27 to the position shown in Fig. 28 and shifts the loop-link to release the outer clutch mechanism of one of the spring-inclosing cases and throws the shifter into connection with the inner clutch mechanism of said inclosing case. This frictionally connects the inclosing case with the shifter through the inner clutch mechanism and causes it to rotate, thereby winding up the spring 11.

The tension of the spring 11 will in time be sufficient to wind the springs 79 on the supplementary shaft 76, and the tension of the springs 79 on said shaft will, through the gear-wheels 81 and 83, wind up the spring 12 and gradually stop the car. When the speed has been slowed sufficiently and it is desired to again start it, the brake-handle is moved to its original position, then back to the rear of the car, and again to its original position. This brings the word "Start" on the indicating-disk beneath the indicating-hand 101 and permits the cam-disk to move three steps—the first to return the loop-link to central position and lock both of the outer clutch mechanisms, the second to the position shown in Fig. 29, which moves the shifter into central position, and the third into position shown in Fig. 30, which releases one of the outer clutch mechanisms, throws the shifter into the inner clutch mechanism of the same inclosing case, and leaves the springs free to unwind and start the car in the direction it was traveling when the brake was applied. When the springs have become entirely unwound, the brake-handle will be moved toward the rear of the car and back again, bringing the word "Off" on the indicating-disk under the hand 101, thus allowing the cam-disk to move two steps and returning the shifter and the loop-link to central position.

To bring the car to a full stop, the brake-handle should be moved toward the rear of the car, which will bring the word "Brake" beneath the indicating-hand 101 and permit the cam-disk to move one step. This will move the loop-link from central position and loosen one of the outer clutches and throw the shifter so as to tighten the inner clutch of the same case. The springs will now begin to wind and gradually stop the car.

When the car is stopped, the brake-handle will be moved back to its central position, which will bring the word "Lock" on the disk beneath the indicating-hand and lock both the outer clutches, and thereby secure the springs against unwinding.

To start the car by the springs, the brake-handle is moved to bring the word "Start" beneath the hand 101 and move the shifter and link into central position and then again to move the link out of central position to release the outer clutch of one of the inclosing cases and throw the shifter into the inner clutch of the same case to permit the springs to start the car in the direction it was traveling when the brake was applied. When the springs have become entirely unwound, the brake-handle will be moved toward the rear of the car and back again, bringing the word "Off" on the indicating-disk under the hand 101, thus allowing the cam-disk to move two steps and returning the shifter and the loop to central position.

If after the car has stopped it should be necessary to run backward, as in case of running past a corner or into an open switch, the brake-handle would not be moved from the position taken to stop the car, but would remain in that position, so that when the momentum of the car had been overcome the springs unwinding in a reverse direction would carry the car backward.

An emergency-brake can be applied by moving the brake-handle toward the rear of the car and quickly back again. This will allow the cam-disk to move two steps, the first into position shown in Fig. 28. The loop-link would then release the outer clutch of one inclosing case, while the outer clutch of the other case would remain tight, and at the same time the shifter would be forced into the inner clutch of the first-mentioned case and expand it. The second step would carry the cam-disk into the position shown in Fig. 29 and would return the loop-link to its original position, thus closing the outer clutch of the first-mentioned case again. Both clutches would now be tight and bring the car to a standstill.

It may not seem plain why the springs unwind in the same direction in which they are wound when the shaft 10 is in connection with one of the inner clutches through the shifter and in an opposite direction when the shaft is in connection with the other inner clutch through the shifter, as in reversing the car. This may be illustrated by winding a clock-spring. If when the spring is under tension the pawl which holds the ratchet on the winding-shaft were to be lifted, the spring will unwind in an opposite direction to that in which it was turned in winding, while if the spring were released at the other end from its connection with the clock-gears it will unwind in the same direction.

The operation of the preferred arrangement of springs in the adaptation shown will be understood clearly by referring to the diagrammatic view in Fig. 33. To distinguish between the springs in Fig. 33, the two main springs on the main shaft are denoted by the letters A and B and the two supplementary springs on the supplementary shaft by C and D. The direction in which the springs wind up is shown by arrows in said figures.

It should be noted that the main shaft is geared to a car-axle and rotates while the car is traveling, that the shifter and the inner clutches rotate in unison with the main shaft, that the main springs are loose on the main shaft, the inner ends of the main springs being secured to gear-wheels which mesh with the toothed inclosing cases that inclose and are attached to the outer ends of the supplementary springs and the outer ends of the main-spring-inclosing cases, and that the inner ends of the supplementary springs are fastened to the supplementary shaft.

Now we will assume that the car is moving forward and we wish to set the brake and stop. The shifter is moved to throw the inner clutch into the inclosing case of spring A and the loop-link to release the outer clutch of said spring A. This connects the spring A with the car-axle and begins to wind up said spring. As said spring A winds up the motion is transmitted through gears to the outer end of spring C, and the tension of spring C starts the supplementary shaft to rotating and begins to wind up the inner end of spring D. As spring D winds up it turns its toothed inclosing case, which transmits the motion through the meshing gear-wheel to the inner end of spring B. The outer end of spring B is held by the outer friction-clutch of said spring. When the car comes to a stop, the loop-link is moved into central position to lock the outer clutch around the inclosing case of spring A and hold the springs in their wound-up position. If it is desired to start the car forward, the shifter is moved to throw the inner clutch of spring B into connection with its inclosing case and the loop-link to relieve the outer clutch of spring B. If it is desired to back the car, the shifter is moved to throw the inner clutch of spring A into clutching position and the loop-link to relieve the outer clutch of spring A. With this arrangement of springs the car can be started forward or backward or operated from either end.

When the car arrives at the end of the route, the indicating-disk would be moved to bring the word "Lock" under the indicating-hand 101. Now to start back in the opposite direction it will be necessary to advance four positions on the disk by quickly moving the handle back and forth twice and turning the disk to bring the words "Off" and "Start" past the hand and the second "Off" beneath the hand. This will leave the disk in precisely the position shown in Fig. 24 and the cam-disk in such position that the first movement of the brake-handle at the opposite end of the car will start the car on its journey in the opposite direction.

While it is advisable to place one of these mechanisms at each end of the car and connect them to each other, so as to operate in conjunction, in some instances but one may be employed, such as on a light car on a slow-running line.

I claim as my invention—

1. In combination, a rotatable element, a spring, means for winding up the spring, and mechanism adapted to operatively connect the rotatable element to either end of the spring.

2. The combination with a rotatable element, of a coil-spring, an inclosing case for said spring, and an inner and an outer clutch mechanism for said inclosing case.

3. The combination with a rotatable element, of a coil-spring adapted to be thrown into connection with said element and wound up by said element and thereby form a brake therefor and to automatically start the rotatable element when unwinding, and means whereby either end of the wound-up spring may be operatively connected to the rotatable element.

4. In a spring-brake mechanism, a rotatable element, a plurality of coil-springs operatively connected to each other, clutch mechanism for frictionally locking the springs to the rotatable element to wind the said springs, means for operating said clutch mechanism and means whereby either end of said springs may be released to start the rotatable element in either direction.

5. The combination with a plurality of springs, of clutch mechanism, a shifter, a cam controlling the shifter and means within convenient reach of the operator for permitting rotation of the cam.

6. In combination, a shaft, a case on said shaft divided into a plurality of compartments, a spring in one compartment of said case, a split ring in another compartment, and a shifter slidably mounted on the shaft and having means for spreading the split ring.

7. In combination, a main shaft, two inclosing cases loosely mounted on the main shaft, main springs in said cases and connected at their outer ends to said cases, a supplementary shaft, two inclosing cases on said supplementary shaft, supplementary springs in said inclosing cases attached at their respective ends to said inclosing cases and the supplementary shaft and having peripheral gear-teeth, gears loose on the main shaft and connected to the inner ends of the main springs and meshing with the teeth of the cases on the supplementary shaft, and means for locking either of the main springs to the main shaft.

8. In combination, a main shaft, two inclosing cases loosely mounted on the main shaft, main springs in said cases and connected at their outer ends to said cases, a supplementary shaft, two inclosing cases on said supplementary shaft, supplementary springs in said inclosing cases attached at their respective ends to said inclosing cases and the supplementary shaft and having peripheral gear-teeth, gears loose on the main shaft and connected to the inner ends of the main springs and meshing with the teeth of the cases on the supplementary shaft, and a shifter for locking either of the main springs to the main shaft.

9. The combination with a rotatable element, of a starting-spring adapted to unwind in either direction desired and thereby start the rotatable element backward or forward, substantially as set forth.

10. The combination with a plurality of springs and cases inclosing said springs, of clutch mechanism, a shifter, a cam-disk controlling the shifter and means within convenient reach of the operator for permitting partial rotation of the cam-disk.

11. In combination, a spring-brake mechanism, a cam controlling said mechanism, a shaft on which said cam is mounted, a spring for rotating said shaft, and means for automatically winding said spring.

12. In combination, a spring-brake mechanism, a cam controlling said mechanism, a shaft on which said cam is mounted, a spring for rotating said shaft, a ratchet connected to said spring and a pawl for turning said ratchet.

13. In combination, a spring-brake mechanism, a cam controlling said mechanism, a shaft on which said cam is mounted, a spring for rotating said shaft, a ratchet connected to said spring, and a pawl for turning said ratchet and having a plurality of yielding connected parts.

14. In combination, a spring-brake mechanism, a cam controlling said mechanism, a shaft on which said cam is mounted, a spring for rotating said shaft, a ratchet connected to said spring, an axle, an eccentric on said axle, and a pawl connected to the eccentric and having a spring-tensioned part which engages the ratchet.

15. In combination, a spring-brake mechanism, a cam controlling said mechanism, a shaft on which said cam is mounted, a spring for rotating said shaft, a ratchet connected to said spring, an axle, an eccentric on said axle, a rod extending from the eccentric, an enlargement on the rod, a tube telescoping on the rod and engaging the ratchet, and a spiral spring on the rod between the tube end and the enlargement.

16. In combination, a plurality of springs, inclosing cases for said springs, a shaft on which said inclosing cases are loosely mounted, inner and outer clutch mechanisms for said inclosing cases, a shifter for throwing the inner clutch mechanism into clutching position, a link controlling the outer clutch mechanism and a cam for operating the shifter and link.

17. In combination, a shaft, two cases loose on said shaft, springs in said cases, a clutch mechanism for each case and a shifter slidably mounted on the shaft.

18. In combination, a shaft, a case on said shaft divided into a plurality of compartments, a spring in one compartment of said case, a split ring in another compartment, spreading arms for said split ring, and a shifting sleeve slidably mounted on the shaft and having means for separating the spreading arms.

19. In combination, a shaft, a case on said shaft divided into a plurality of compartments, a spring in one compartment of said case, a split ring in another compartment, spreading arms for said split ring, a shifting sleeve slidably mounted on the shaft, and a lateral wedge having support from the sleeve for separating the spreading arms.

20. In combination, a main shaft, a supplementary shaft, a set of main springs loose on the main shaft, a set of supplementary springs on the supplementary shaft, and mechanisms connecting the inner ends of the main springs to the outer ends of the supplementary springs, whereby the winding or unwinding of one of the main springs will gradually wind or unwind the balance of the springs.

21. The combination with a rotatable element such as a car-axle, of a plurality of springs operatively connected together to collectively wind or unwind, and means whereby either end of said springs when wound up may be operatively connected to the rotatable element.

22. The combination with a spring-brake, and a rotatable element such as an axle, of a cam, clutch mechanism for operatively connecting the brake to the rotatable element, and an operating device for said clutch mechanism controlled by the cam.

23. The combination with a car-axle, of a main shaft, two inclosing cases loose on said shaft, main springs in said inclosing cases connected at their outer ends to the inclosing cases, a supplementary shaft, two inclosing cases loose on the supplementary shaft, supplementary springs in the inclosing cases and fastened at their respective ends to the inclosing cases and shaft, said inclosing cases being peripherally toothed, gears loose on the main shaft and meshing with the teeth of the inclosing cases on the supplementary shaft to which the inner ends of the main springs are connected, an inner and outer clutch mechanism for each inclosing case on the main shaft, a link controlling the outer clutch mechanism, and a shifter controlling the inner clutch mechanisms.

24. The combination with an axle and a brake, of a cam controlling said brake, a shaft on which said cam is mounted, an inclosing case on said shaft, a spring in said case and means for rotating the case from the axle to gradually wind up the spring.

25. The combination with a spring-brake, and an axle, of a disk having a peripheral cam depression, clutch mechanism for operatively connecting the brake to the axle, and an operating device for said clutch mechanism having a roller in the cam depression in the disk.

26. The combination with a spring-brake and an axle, of a disk having a peripheral cam depression, clutch mechanism for operatively connecting the brake to the axle, clutch mechanism for locking the brake in tensioned condition, and operating devices for said clutch mechanisms having rollers in the cam depression in the disk.

27. In combination, a shaft, an inclosing case loose on said shaft having a plurality of compartments, a spring in one of said compartments, a split ring in another compartment, a collar around the shaft, two shafts movably mounted on the collar, rollers on said shafts, and a tapered wedge for separating said rollers to separate the split ring and force it to frictionally engage the inner surface of the inclosing case.

28. In combination, a shaft, an inclosing case loose on said shaft having a plurality of compartments, a spring in one of said compartments, a split ring in another compartment having a substantially horizontal top surface provided with two depressions having tapered outer walls, two shafts having their lower ends fitting in said depressions, rollers on said shafts, and a tapered wedge for separating said rollers to separate the split ring and force it to frictionally engage the inner surface of the inclosing case.

29. In a spring-brake, a shaft, two springs on said shaft, an inclosing case for each spring, a clutch mechanism for each case, a sleeve shiftably arranged on the shaft between the springs, two rings mounted on said sleeve and a clutch-operating wedge extending laterally from each ring.

30. In combination, an axle, a shaft, gears connecting said shaft to the axle, springs loose on said shaft, cases inclosing said springs and connected to the outer ends thereof, mechanism operatively connecting the inner ends of said springs and clutch mechanism for locking one of said inclosing cases to the shaft.

31. In combination, an axle, a shaft, gears connecting said shaft to the axle, springs loose on said shaft, cases inclosing said springs and connected to the outer ends thereof, mechanism operatively connecting the inner ends of said springs, an inner clutch mechanism for each inclosing case, a shifter on the shaft having means for setting either of said inner clutch mechanisms, and a cam mechanism for operating the shifter.

32. The combination with a rotatable element of a spring-brake, a clutch device for operatively connecting said spring-brake with said element, a disk provided with a peripheral recess, the opposed walls of which are inclined in parts to constitute cam-surfaces, a shifting arm having a part projecting in the peripheral recess, means operated from the shifting arm for operating the clutch, a shifter for the clutch device connected to the shifting arm and a separate independent clutch device for locking said spring-brake in its wound condition.

33. The combination with a rotatable element of a spring-brake, a clutch device for operatively connecting said spring-brake with said element, spring-winding and spring-locking clutches and means controlling said clutches whereby the spring may be wound up, locked in its wound-up condition and released at will, substantially as set forth.

34. The combination with a spring-brake, of an automatically-rotated cam controlling said brake and means for releasing said cam and permitting it to operate the brake.

35. The combination with a shaft, of springs on said shaft inclosing cases for said springs, a spring friction-ring around each case having rods projecting from its ends and carrying rollers, and a link having a loop at each end inclosing the rollers, the walls of the loops being shaped in one portion to tighten the rings around the inclosing cases.

36. The combination with an axle, of a pair of springs adapted to be wound up by said axle, and thereby act as a brake therefor, and a link device for locking said springs against unwinding.

37. The combination with an axle, of a pair of springs adapted to be wound up by said axle and thereby act as a brake therefor and a loop-link for locking said springs against unwinding.

38. The combination with an axle, of a pair of springs adapted to be wound up by said axle and thereby act as a brake therefor, an inclosing case for each spring and attached to the outer end of said spring, a clutch-band around each case, a link connecting said clutches, a cam and an angular lever having connection to the link and operated from the cam, substantially as set forth.

39. The combination with an axle, of a pair of springs adapted to be wound up by said axle and thereby act as a brake therefor, an inclosing case for each spring and attached to the outer end of said spring, a clutch-band around each case, a link connecting said clutches, a cam, an angular lever operated from the cam and connected to the link, a bell-crank connected to the lever, a brake-handle controlling the bell-crank and a cam-stopping mechanism connected to the bell-crank, substantially as set forth.

40. The combination with an axle and a spring-brake therefor, of a cam controlling said spring-brake and having a series of lateral enlargements, means for turning said cam, a brake-handle and two bars operated by the brake-handle and extending close to the cam sides, said bars having depressions for the passage of the lateral enlargements, substantially as set forth.

41. The combination with an axle and a spring-brake therefor, of a cam controlling said spring-brake and having a series of lateral enlargements, means for turning said cam, a brake-handle, a substantially horizontal bar adapted to be rocked by the brake-lever and two vertical bars connected to the horizontal bar and extending close to the cam sides, substantially as set forth.

42. The combination with a brake of a controlling mechanism including a shaft having operative connection to the brake, a ratchet-wheel on the shaft, a position-indicating disk above the ratchet and a brake-handle having a pawl for turning the ratchet.

43. The combination with a brake of a controlling mechanism including a shaft having operative connection to the brake, a position-indicating disk having the words "Start" "Lock" "Brake" "Off" or words of like purport attached to the shaft and a handle for turning the shaft.

44. The combination with a brake of a controlling mechanism including a shaft having operative connection to the brake, a ratchet-wheel on the shaft, a position-indicating disk above the ratchet, a pivotal arm having a slot, a brake-handle attached to the shaft, a pawl pivoted to the brake-handle and engaging the ratchet-wheel and a pin extending from the pawl and slidably extending into the slot in the pivotal arm.

45. The combination with a brake of a controlling mechanism including a shaft having operative connection to the brake, a ratchet-wheel on the shaft, a position-indicating disk above the ratchet, an angular pivotal arm having an angular slot, a brake-handle pivoted to the shaft, a pawl pivoted to the brake-handle and having a pin projecting into the slot.

46. The combination with a brake of a controlling mechanism including a shaft having operative connection to the brake, a ratchet-wheel on the shaft, a position-indicating disk above the ratchet, an angular pivoted arm having a V-shaped slot, a brake-handle pivoted to the shaft, a pawl pivoted to the brake-handle, a pin extending from the pawl and into the V-shaped slot and a spring for holding the pawl in engagement with the ratchet-wheel.

47. The combination with a car-axle, of a plurality of springs connected together to wind and unwind in conjunction, means for connecting the springs to the car-axle to wind them up and thus act as a brake, independent means for locking said springs in wound-up condition and means for releasing said springs to unwind in either direction desired and thereby start the car backward or forward, substantially as set forth.

48. The combination with a car-axle, of a spring, means for connecting the spring to the axle to wind up said spring and also serve as a brake, and means whereby either end of the wound-up spring may be released, substantially as set forth.

49. The combination with a car-axle, of a spring, means for connecting one end of the spring to the axle to wind up the same and by its tension serve as a brake, means for locking the other end of the spring and means for releasing either end of said spring, substantially as set forth.

50. The combination with an axle, of a spring, two independent clutch mechanisms adapted to clutch opposite ends of said spring and means for connecting said clutch mechanisms to said spring to wind up and lock said spring and means for releasing either clutch mechanism.

51. The combination with an axle, of a spring, an outer clutch mechanism adapted to clutch the outer end of the spring, an inner clutch mechanism adapted to clutch the inner end of the spring, mechanism operatively connecting said clutch mechanisms to the axle and means for operating said clutches.

52. The combination with an axle, of a spring, an outer clutch mechanism adapted to clutch the outer end of the spring, an inner clutch mechanism adapted to clutch the inner end of the spring, mechanism operatively connecting said clutch mechanisms to the axle and a cam for operating said clutches.

53. The combination with an axle, of a spring, an outer clutch mechanism adapted to clutch the outer end of the spring, an inner clutch mechanism adapted to clutch the inner end of the spring, an operating device extending from each clutch mechanism and including a roller, and a cam adapted to engage the rollers of said devices, substantially as set forth.

54. The combination with an axle, of a spring, an outer clutch mechanism adapted to clutch the outer end of the spring, an inner clutch mechanism adapted to clutch the inner end of the spring, an operating device extending from each clutch mechanism and including a roller, and a cam having a peripheral depression adapted to receive the rollers of said devices, substantially as set forth.

55. The combination with a car-axle, of a plurality of springs connected together to wind and unwind in conjunction, clutch mechanism for temporarily connecting the springs to the car-axle, clutch mechanism for temporarily locking said springs, and a cam having means for releasing either of said clutch mechanisms, substantially as set forth.

56. In combination, a shaft, an inclosing case loose on said shaft, a spring in said inclosing case, a clutch mechanism including a split ring and mechanism for operating the clutch mechanism having a wedge for spreading the split ring, substantially as set forth.

57. In combination, two main springs, two supplementary springs, mechanism connecting the inner end of each main spring to the outer end of one of the supplementary springs, mechanism connecting the inner ends of the supplementary springs, an axle, and mechanism for temporarily connecting the outer end of either of the main springs to the axle.

58. The combination with a rotatable element, of a spring, means for connecting one end of the spring to the rotatable element to wind up the same and by its tension serve as a brake, means for locking the other end of the spring and means for releasing either end of said spring, substantially as set forth.

59. In combination, two main springs, two supplementary springs, mechanism connecting the inner end of each main spring to the outer end of one of the supplementary springs, mechanism connecting the inner ends of the supplementary springs, an axle, clutch mechanism for connecting the outer end of either of the main springs to the axle and clutch mechanism for locking said springs when wound up.

60. In combination, two oppositely-coiled main springs A and B, two oppositely-coiled supplementary springs C and D, mechanism connecting springs A and C to each other and B and D to each other, mechanism connecting the supplementary springs C and D, an axle, and mechanism for operatively connecting either of the main springs to the shaft.

61. In combination, two oppositely-coiled main springs, two oppositely-coiled supplementary springs, mechanism connecting each main spring to an oppositely-coiled supplementary spring, an axle, and mechanism for operatively connecting either of the main springs to the axle.

62. In combination, an axle, a main shaft geared to the axle, two oppositely-coiled main springs loose on the main shaft, a supplementary shaft, two oppositely-coiled supplementary springs fastened at their inner ends to said supplementary shaft, mechanism connecting each of the main springs to the outer end of one of the supplementary springs and clutch mechanism for connecting either of the main springs to the main shaft.

63. In combination, springs operatively connected together to wind or unwind in conjunction, a rotatable device, and mechanism for temporarily connecting the outer end of either of the springs to the rotatable device.

64. In combination, a plurality of springs, mechanism connecting said springs so that they may wind or unwind in conjunction, an axle and friction-clutch mechanism for connecting said springs to said axle to constitute a brake therefor.

65. In combination, two oppositely-coiled springs, mechanism connecting said springs so as to wind or unwind in conjunction, an axle, and mechanism for operatively connecting either of the springs to the axle.

66. In combination, an axle, two oppositely-coiled springs, means for connecting one end of each of said springs so as to wind or unwind in conjunction and means for operatively connecting the remaining end of either spring to the axle.

JESSE A. FIELD.

Witnesses:
W. C. MARSH,
J. F. GEARY.